United States Patent [19]
Wong Shing et al.

[11] Patent Number: 6,019,904
[45] Date of Patent: Feb. 1, 2000

[54] HYDROPHILIC DISPERSION POLYMERS OF DIALLYLDIMETHYL AMMONIUM CHLORIDE AND ACRYLAMIDE FOR THE CLARIFICATION OF DEINKING PROCESS WATERS

[75] Inventors: Jane B. Wong Shing, Aurora; Karen R. Tubergen, Mt. Prospect, both of Ill.

[73] Assignee: Nalco Chemical Company, Naperville, Ill.

[21] Appl. No.: 08/985,477

[22] Filed: Dec. 5, 1997

Related U.S. Application Data

[63] Continuation-in-part of application No. 08/743,437, Nov. 1, 1996, Pat. No. 5,750,034.

[51] Int. Cl.[7] .................................................. C02F 1/24
[52] U.S. Cl. ..................... 210/705; 210/734; 210/735; 210/917; 210/928; 162/189; 162/190
[58] Field of Search .................................... 210/705, 734, 210/735, 917, 928; 162/5, 189, 190

[56] References Cited

U.S. PATENT DOCUMENTS

| | | |
|---|---|---|
| 4,077,930 | 3/1978 | Lim . |
| 4,147,681 | 4/1979 | Lim et al. . |
| 4,151,202 | 4/1979 | Hunter et al. . |
| 4,715,962 | 12/1987 | Bhattacharyya et al. . |
| 4,738,750 | 4/1988 | Ackel . |
| 4,874,521 | 10/1989 | Newman et al. . |
| 4,929,655 | 5/1990 | Takeda . |
| 5,006,590 | 4/1991 | Takeda . |
| 5,013,456 | 5/1991 | St. John et al. . |
| 5,032,286 | 7/1991 | Newman et al. . |
| 5,178,770 | 1/1993 | Chung . |
| 5,207,924 | 5/1993 | Reed et al. . |
| 5,254,221 | 10/1993 | Lowry et al. . |
| 5,292,793 | 3/1994 | Ramesh . |
| 5,308,499 | 5/1994 | Dixon . |
| 5,314,627 | 5/1994 | Ramesh . |
| 5,454,955 | 10/1995 | Albrecht . |
| 5,466,338 | 11/1995 | Pearson . |
| 5,573,675 | 11/1996 | Sommese et al. . |
| 5,587,415 | 12/1996 | Takeda . |

FOREIGN PATENT DOCUMENTS 2139884  3/1996  Canada .

*Primary Examiner*—Thomas M. Lithgow
*Attorney, Agent, or Firm*—Michael B. Martin; Thomas M. Breininger

[57] ABSTRACT

The invention comprises a method for clarifying ink-laden water obtained from the recycling of paper stocks by treating said water with a hydrophilic dispersion polymer. The hydrophilic dispersion polymer of the invention is a copolymer of a diallyl N,N-disubstituted ammonium halide cationic monomer and (meth)acrylamide (AcAm). Following dosing with the polymer, a floc is formed. The floc contains ink and impurities which are removed from the water process stream by means of solid liquid separation; the solid liquid separation comprising a dissolved air flotation method. A preferred copolymer is formed from DADMAC and AcAm.

10 Claims, No Drawings

6,019,904

HYDROPHILIC DISPERSION POLYMERS OF DIALLYLDIMETHYL AMMONIUM CHLORIDE AND ACRYLAMIDE FOR THE CLARIFICATION OF DEINKING PROCESS WATERS

The present application is a continuation-in-part of Ser. No. 08/743,437 filed Oct. 1, 1996 now U.S. Pat. No. 5,750,034 by Jane B. Wong Shing and Karen R. Tubergen entitled "Hydrophilic Dispersion Polymers for the Clarification of Deinking Process Waters."

FIELD OF THE INVENTION

The invention relates to the clarification of deinking process waters which result from the recycling of paper stocks. More specifically, the present invention relates to the use of hydrophilic dispersion copolymers of diallyl-N,N-disubstituted ammonium halide and (meth)acrylamide as water clarifying agents for deinking influents. A preferred copolymer is formed from diallyldimethylammonium chloride (DADMAC) and acrylamide (AcAm).

BACKGROUND OF THE INVENTION

Recycled paper is increasingly used as a pulp source. One of the major pulping steps involves removal of the ink from any source of printed recycled paper. Large volumes of water are required for the ink removal process and its clean-up is accomplished using a solids/liquid separation unit operation. Dissolved air flotation (DAF) is commonly used.

Dissolved air flotation is a solids-removal process where fine air bubbles become attached to the suspended particles, thus reducing the density of individual particles and causing them to float to the surface. The separated solids then form a floating layer that is a mixture of solids and air bubbles. The buoyant force exerted by the entrapped air also acts to compact the solids into a smaller volume before the floating layer is skimmed off.

Air is usually introduced to the inflowing ink-laden water via a pressurized mixing chamber. When the influent enters the non-pressurized flotation unit, the supersaturated solution releases the air in the form of very fine bubbles which become attached to the suspended particles. To get maximum results from a flotation unit, a clarification aid must be added along with the air. Flotation methods can achieve high levels of suspended solids removal, up to 98%.

Recycle mills are most frequently located in the metropolitan areas where an emphasis on closing the water cycle of the mill is great. Consequently, effective clean-up of the deinking wash waters becomes important because reuse of the water generated e.g. from a DAF, can lead to reduced sheet quality such as brightness. Also, if these waters are used for other purposes, minimizing the amounts of BOD/-COD and suspended solids is desirable.

Clarification chemicals are typically utilized in conjunction with mechanical clarifiers for the removal of solids from the process water stream. The clarification chemicals coagulate and/or flocculate the suspended solids into larger particles, which can then be removed from the process stream by gravitational settling or flotation.

Clarification generally refers to the removal of nonsettleable material by coagulation, flocculation and sedimentation. Coagulation is the process of destabilization by charge neutralization. Once neutralized, particles no longer repel each other and can be brought together. Coagulation is necessary for removal of colloidal sized suspended matter. Flocculation is the process of bringing together the destabilized, "coagulated" particles to form a larger agglomeration or floc.

Depending upon the characteristics of the individual waters, differing chemical types and programs may be utilized. It is conventional to utilize a dual polymer program for clarification of deinking process waters by dissolved air flotation. Typically, this comprises a low molecular weight cationic coagulant followed by a high molecular weight flocculant.

It is customary to use coagulants prior to using flocculants in the deinking process waters to provide charge neutralization. This affords efficient solids removal. Typical conventional cationic coagulants are poly(diallyldimethyl ammonium chloride), amphoteric diallyldimethyl ammonium chloride/acrylic acid containing copolymers, condensation polymers of ethylene dichloride/ammonia or diinethylamine/epichlorohydrin. Conventional acrylamide-based flocculants have been utilized to assist in the solid/liquid separation. For example, novel copolymers of poly(diallyldimethylammonium chloride/3-acrylamido-3-methylbutanoic acid) are disclosed in U.S. Pat. No. 5,207,924, and polymers formed from vinylamine are disclosed in U.S. Pat. No. 5,573,675 as coagulants for the clarification of deinking process waters. Moreover, the use of hydrophilic dispersion polymers for the clarification of deinking process waters are disclosed in U.S. patent application Ser. No. 08/743,437, now U.S. Pat. No. 5,750,034, the disclosure of which is hereby incorporated by reference. In that reference, the dispersion polymer must be utilized in a dual polymer program for optimal activity.

By contrast, within the general class of polymers described herein, the preferred polymer of the invention is a hydrophilic dispersion copolymer of diallyldimethyl ammonium chloride (DADMAC) and (meth)acrylamide—a single treatment agent. The advantage of the invention disclosed herein is that it is a method which employs a dispersion polymer which is the sole treatment agent. Though other treatment agents may be added as adjuncts, they are not required for activity. Another advantage of this invention is that the use of these dispersion polymers affords removal of particulate materials without the unwanted addition of oils and surfactants contained in conventional latex polymers. Moreover, these polymers require no inverter system and can be introduced to the paper process stream using simple feeding equipment.

SUMMARY OF THE INVENTION

The invention comprises a method for clarifying ink-ladened water obtained from the recycling of paper stocks by treating said water with a hydrophilic dispersion polymer. The hydrophilic dispersion polymer comprises: (a) cationic monomer diallyl-N,N-disubstituted ammonium halide and (b) a second monomer represented by (meth)acrylamide (in an aqueous solution of a polyvalent anionic salt), wherein the polymerization is carried out in the presence of a dispersant. Resultant from the addition of the polymers is a clarified process water stream and highly flocculated solids, the latter being readily handled by ordinary solid/liquid separation processes, such as a dissolved air flotation method.

DESCRIPTION OF THE INVENTION

The invention comprises a method for clarifying ink-ladened water obtained from the recycling of paper stocks by treating said water with a hydrophilic dispersion polymer.

The hydrophilic dispersion polymer of the invention is a copolymer of diallyl-N,N-disubstituted ammonium halide cationic monomer and (meth)acrylamide. It has been found that the polymer described above confers advantages for use in a papermaking process. Specifically, the hydrophilic dispersion polymers of the invention show improved or equal activity with respect to deinking process water clarification as compared to a typical mill treatment program. The use of these polymers affords removal of particulate materials without the unwanted addition of oils and surfactants contained in conventional latex polymers. Additionally, these flocculants require no inverter system and can be introduced to the paper process stream using simple feeding equipment.

Another advantage concerns the mode of addition of the dispersion polymers. In most cases, conventional water-soluble polymers are now commercially available in a powder form. Prior to use, one must dissolve the polymeric powder in an aqueous medium for actual application. The polymer swells in aqueous medium, and the dispersed particles flocculate. It is typically very difficult to dissolve the conventional polymers in an aqueous medium. By contrast, the dispersion polymers of this invention, by their nature, avoid dissolution-related problems.

Most importantly however, the dispersion copolymers formed from DADMAC and acrylamide have a more advantageous flexibility in that they may be used as the sole polymeric treatment, replacing the conventional dual polymer program which requires both a conventional coagulant and a flocculant.

The aqueous dispersion in accordance with the present invention, if required in the form of an aqueous solution resulting from dilution with water, can be advantageously used in a number of technological fields as flocculating agents, thickeners, soil conditioners, adhesives, food additives, dispersants, detergents, additives for medicines or cosmetics, among others.

The Monomers

Example 1 outlines the process for preparing the copolymer at various ratios of the monomer components in the range of from about 1:99 to about 99:1 of acrylamide type monomer to diallyl-N,N-disubstituted ammonium halide. Each of the two types of monomers utilized to form the dispersion polymers of this invention will be described in greater detail. As concerns the diallyl-N,N-disubstituted ammonium halide, the di-substitutents of the monomer may be $C_1$–$C_{20}$ alkyl groups, aryl groups, alkylaryl groups or arylalkyl groups. Moreover, each of the di-substituents can be a different group. For example, one intended halide is N-methyl-N-ethyl-N,N-diallyl ammonium chloride.

A specific example of one applicable halide is DADMAC. Preferably, the amount of diallyldimethyl ammonium chloride present in the copolymer is from about 5 mole percent to about 30 mole percent. Diallyl-N,N-disubstituted ammonium halides, especially diallyldimethyl ammonium chloride are well-known and commercially available from a variety of sources. In addition to chloride, the counterion may also be bromide, sulfate, phosphate, monohydrogen phosphate, and nitrate among others. One method for the preparation of DADMAC is detailed in U.S. Pat. No. 4,151,202, the disclosure of which is hereinafter incorporated by reference into this specification.

As concerns the acrylamide-type monomers, substituted (meth)acrylamide monomers may have either straight chained or branched alkyl groups. Applicable monomers include, but are not limited to ethyl hexyl (meth)acrylamide, diethylaminopropyl (meth)acrylamide, dimethylaminohydroxypropyl (meth)acrylamide, N-isopropyl (meth) acrylamide, N-tert-butyl (meth)acrylamide, $C_1$–$C_{10}$ N-alkyl acrylamide, $C_1$–$C_{10}$ N-alkyl methacrylamide, N-aryl acrylamide, N-aryl methacrylamide, N-arylalkyl acrylamide, N-isopropyl (meth)acrylamide, N,N-dimethylacrylamide (meth)acrylamide, $C_1$–$C_{10}$ N,N-dialkyl acrylamide, $C_1$–$C_{10}$ N, N-dialkyl methacrylamide, N,-N-diaryl acrylamide, N-N-diaryl methacrylamide, N,N-diallylalkyl acrylamide, and N,N-diarylalkyl methacrylamide. As utilized herein, the term arylalkyl is meant to encompass benzyl groups and phenethyl groups. Pendant amine refers to an $NH_2$ group which is attached to the main polymer chain.

The Polyvalent Anionic Salts

The polyvalent anionic salt to be incorporated in the aqueous solution according to the present invention is suitably a sulfate, a phosphate or a mixture thereof. Preferable salts include ammonium sulfate, sodium sulfate, magnesium sulfate, aluminum sulfate, ammonium hydrogen phosphate, sodium hydrogen phosphate and potassium hydrogen, phosphate. In the present invention, these salts may be each used as an aqueous solution thereof having a concentration of 15% or above.

The Dispersant

A dispersant polymer is present in the aqueous anionic salt solution in which the polymerization of the above monomers occurs. The dispersant polymer is a water-soluble high molecular weight cationic polymer. The dispersant polymer is preferably soluble in the above-mentioned aqueous salt solution. The dispersant polymer is preferably used in an amount of from 1 to 10% by weight based on the total weight of the monomers. The dispersant polymer is composed of 20 mole % or more of cationic monomer units of diallyl disubstituted ammonium halide or N,N-dialkyl-aminoethyl(meth)acrylates and their quaternary salts. Preferably, the residual mole % is acrylamide or methacrylamide. The performance of the dispersant is not greatly affected by molecular weight. However, the molecular weight of the dispersant is preferably in the range of 10,000 to 10,000,000. Preferred dispersants are homopolymers of diallyldimethyl ammonium chloride, dimethylaminoethylacrylate methyl chloride quaternary salt and dimethylaminoethylmethacrylate methyl chloride quaternary salt. According to one embodiment of the invention, a multifunctional alcohol such as glycerin or polyethylene glycol is coexistent in the polymerization system. The deposition of the fine particles is smoothly carried out in the presence of these alcohols. Moreover, polysaccharides such as starch, dextran, carbomethoxy cellulose and pullulan among others can also be used as stabilizers either solely, or in conjunction with other organic cationic flocculants.

The Dispersion Polymers

For the polymerizations, a usual water-soluble radical-forming agent can be employed, but preferably water-soluble azo compounds such as 2,2'-azobis(2-amidinopropane) hydrochloride and 2,2'-azobis(N,N'-dimethyleneisobutylamine) hydrochloride are used.

According to one embodiment of the invention, a seed polymer is added before the beginning of the polymerization of the above monomers for the purpose of obtaining a fine dispersion. The seed polymer is a water-soluble cationic polymer insoluble in the aqueous solution of the polyvalent anion salt. The seed polymer is preferably a polymer prepared from the above monomer mixture by the process described herein.

Nevertheless, the monomer composition of the seed polymer need not always be equal to that of the water-soluble cationic polymer formed during polymerization. However, like the water-soluble polymer formed during polymerization, the seed polymer should contain at least 5 mole percent of cationic monomer units of diallyldimethylammonium halide. According to one embodiment of the invention, the seed polymer used in one polymerization reaction is the water-soluble polymer prepared in a previous reaction which used the same monomer mixture.

An aspect of this invention is a method for clarifying paper process water containing ink and other impurities, comprising the steps of:

a) treating said process water with an effective turbidity-reducing amount of a hydrophilic dispersion polymer resulting from polymerization of
  i.) a cationic monomer diallyl-N,N-disubstituted ammonium halide wherein the substituents of said disubstituted ammonium halide are selected from the group consisting of $C_1$–$C_{20}$ alkyl groups, aryl groups, alkylaryl groups and arylalkyl groups
  ii. a second monomer of the formula

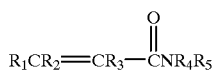

wherein $R_1$ and $R_2$ are selected from the group consisting of hydrogen, $C_1$–$C_{10}$ alkyl groups, aryl groups and alkylaryl groups; $R_3$ is selected from the group consisting of hydrogen and methyl groups and $R_4$ and $R_5$ are selected from the group consisting of $C_1$–$C_{10}$ straight chain or branched alkylene groups and hydrogen, in an aqueous solution of a polyvalent anionic salt wherein said polymerization is carried out in the presence of a dispersant;

b) allowing the treated process water of step a) to separate into a solid ink and other impurity containing layer and a clarified liquid layer; and, c) recovering said separated layers by dissolved air flotation.

The cationic monomer may be diallyldimethyl ammonium chloride and said second monomer may be acrylamide. The hydrophilic dispersion polymer may have a cationic charge of from about 1 mol % to about 30 mol %.

Additionally, conventional coagulants, conventional flocculants, alum, or a combination thereof may also be utilized as adjuncts with the dispersion polymers, though it must be emphasized that the dispersion polymer does not require any adjunct for optimization of activity.

Furthermore, the range of intrinsic viscosities for the hydrophilic dispersion polymers of the invention is from about 0.5 to about 10 dl/g, preferably from about 1.5 to about 8.5 dl/g and most preferably from about 2.5 to about 7.5 dl/g. Depending upon the conditions at the particular mill, the preferred dose is from about 0.5 to about 500 ppm.

The Method

In order to accomplish the solid/liquid separation distinct bodies, or flocs, must be formed with the aid of a flocculant. The preferred polymer of the invention is a copolymer of diallyldimethyl ammonium chloride cationic monomer and (meth)acrylamide (AcAm) which has the unique ability to act as either a coagulant or flocculant in papermaking systems. The polymer has an intrinsic viscosity of from about 0.5 to about 10 deciliters per gram (dl/g), most preferably from about 2.5 to about 7.5 dl/g.

The polymer is believed to cause the aggregation of neutralized colloidal particles which are suspended in the paper process water stream. Aggregation is the result of either entrapping agents (i.e., inorganic flocculants) or bonding agents (i.e., organic flocculants) bringing the neutralized particles together.

Traditionally, coagulants are preferably added to the system in solution form prior to the DAF unit while the flocculants are added to the DAF unit following dissolved air injection. The polymers of the instant invention may be added in an effective amount, generally between about 0.5–100 ppm. However, as is understood by those skilled in the art, the amount of the polymer necessary will be dependant upon the nature of the DAF influent at the particular mill to be treated.

The following examples are presented to describe preferred embodiments and utilities of the invention and are not meant to limit the invention unless otherwise stated in the claims appended hereto.

EXAMPLE 1

A dispersion copolymer of 30% mol diallyldimethyl ammonium chloride and acrylamide was synthesized in the following manner. To a two liter resin reactor equipped with stirrer, temperature controller, and water cooled condenser, was added 25.667 grams of a 40.0% solutions of acrylamide (0.1769 moles), 161.29 grams of a 62.0% solution of DADMAC (0.6192 moles), 200 grams of ammonium sulfate, 40 grams of sodium sulfate, 303.85 grams of deionized water, 0.38 grams of sodium formate, 45 grams of a 20% solution of poly(DMAEA·MCQ) (dimethylaminoethylacrylate methyl chloride quatemary salt, IV=2.0 dl/gm), and 0.2 grams of EDTA. The mixture was heated to 48° C. and 2.50 grams of a 4% solution of 2,2-azobis(2-amidinopropane) dihydrochloride and 2.50 grams of a 4% solution of 2,2'-azobis(N,N'-dimethylene isobutryramidine) dihydrochloride was added. The resulting solution was sparged with 1000 cc/min of nitrogen. After 15 minutes, polymerization began and the solution became viscous. Over the next 4 hours the temperature was maintained at 50° C. and a solution containing 178.42 grams of 49.0% acrylamide (1.230 moles) and 0.2 grams of EDTA was pumped into the reactor using a syringe pump. The resulting polymer dispersion had a Brookfield viscosity of 4200 cps. The dispersion was then further reacted for 2.5 hours at a temperature of 55° C. The resulting polymer dispersion had a Brookfield viscosity of 3300 cps. To the above dispersion was added 10 grams of 99% adipic acid, 10 grams of ammonium sulfate, and 12.5 grams of a 60% aqueous solution of ammonium thiosulfte. The resulting dispersion (Composition M) had a Brookfield viscosity of 1312.5 cps and contained 20% of a 50 weight percent copolymer of acrylamide and DADMAC with an intrinsic viscosity of 6.32 dl/gm in 1.0 molar $NaNO_3$. Polymers and their respective descriptions used in this invention are summarized in Table I.

TABLE I

Polymer Description

| Composition | Description | Intrinsic Viscosity (dl/g) |
|---|---|---|
| A[1] | epichlorohydrin/dimethylamine condensation polymer in solution | 0.11 |
| L[2] | poly(DADMAC), solution polymer | 0.75 |
| M[3] | dispersion polymer of DADMAC and AcAm, 30/70 mole ratio DADMAC/AcAm | 4.7 |
| N[4] | poly(NaAc/AcAm) latex polymer, 7/93 mole ratio NaAc/AcAm | 21.7 |
| Alum[5] | Papermaker's alum, 50 wt % solution | |

[1] = conventional treatment, available from Nalco Chemical Company of Naperville, Il
[2] = conventional treatment, available from Nalco Chemical Company of Naperville, Il
[3] = synthesized according to Example 1
[4] = conventional treatment, available from Nalco Chemical Company of Naperville, Il
[5] = conventional treatment, available from CYTEC Industries of Stamford, CT.

EXAMPLE 2

To determine the activity of the dispersion polymers synthesized according to the procedure of Example 1, the following procedure was utilized. Samples of DAF influent were obtained from a Southern newsprint deinking mill. All samples were stored at 4° C. and tested within five days.

Typical jar testing methods were used to monitor polymer performance. Generally, conventional coagulants were prepared as 1% (actives/products) solutions and flocculants as ~0.1% (product) solutions in deionized water. Dosages reported are based on actives/product for coagulants and as product for flocculants. To test the dispersion polymers, 0.1% solutions were utilized. Samples of the deinking influent were stirred at 200 rpm (fast mix) for 3 min. wherein the coagulant was added at the beginning of the fast mix and the flocculant during the last 40 seconds of the fast mix. This was followed by a slow mix of 25 rpm for 2 minutes. The samples were allowed to settle for 5 minutes and an aliquot of the upper liquid layer was removed and diluted appropriately when required. Turbidity measurements were acquired with a HACH DR-2000 at 450 nm.

A series of experiments were performed using the hydrophilic dispersion copolymer DADMAC/AcAm (Composition M). The results are summarized in Tables II–V. In Tables II–V, a lower turbidity indicates that greater solids-liquids separation has been affected. Therefore, the greater the turbidity reduction, the more effective the treatment. This data illuminates the idea that Composition M can be used either as a coagulant (Table III) or a flocculant (Tables II, IV) in deinking water clarification. Turbidity reduction of the DAF influent with Composition M in a variety of programs was similar to or superior to the current Southern newsprint deinking mill.

The results of Table II demonstrate that composition M alone (without alum) is superior to conventional treatments, and also that use of composition M in combination with alum results in a greater turbidity reduction, while reducing amount of alum required for efficiency.

TABLE II

Screening of Dispersion Polymer formed from DADMAC and AcAm in the Presence or Absence of Alum for the Clarification of DAF Influent (A Southern Newsprint Mill DAF Water)

| Program | Dosage (ppm) | Turbidity (NTU) | % Turbidity Reduction |
|---|---|---|---|
| None | — | 486 | — |
| Alum/Composition A/Composition N[1] | 300/3/4 | 138 | 71.6 |
| Composition M | 8 | 127 | 73.9 |
| Composition M | 12 | 110 | 77.4 |
| Alum/composition M | 20/4 | 150 | 69.1 |
| Alum/composition M | 20/8 | 123 | 74.7 |
| Alum/composition M | 20/12 | 106 | 78.2 |
| Alum/composition M | 20/16 | 103 | 78.8 |
| Alum/composition M | 30/4 | 163 | 66.5 |
| Alum/composition M | 300/4 | 158 | 67.5 |
| Alum/composition M | 300/8 | 72 | 85.2 |
| Alum/composition M | 300/12 | 46 | 90.5 |

[1] = conventional program

The results of Table III illustrate that when a conventional treatment program (second row) is compared with the one including the dispersion polymer in combination with a coagulant conventional treatment agent (rows 3–11), the dispersion polymer containing program provides superior results.

TABLE III

Screening of Dispersion Polymer formed from DADMAC and AcAm in Conjunction with Coagulant for the Clarification of DAF Influent (A Southern Newsprint Mill DAF Water)

| Program | Dosage (ppm) | Turbidity (NTU) | % Turbidity Reduction |
|---|---|---|---|
| None | — | 486 | — |
| Alum/Composition A/Composition N[1] | 300/3/4 | 138 | 71.6 |
| Composition A/Composition M | 3/4 | 118 | 75.7 |
| Composition A/Composition M | 2/8 | 101 | 79.2 |
| Composition A/Composition M | 3/8 | 91 | 81.3 |
| Composition A/Composition M | 6/8 | 77 | 84.2 |
| Composition A/Composition M | 3/12 | 85 | 82.5 |
| Composition L/Composition M | 3/8 | 130 | 73.3 |
| Alum/Composition L/Composition M | 300/3/8 | 44 | 90.9 |
| Alum/Composition A/Composition M | 300/2/8 | 37 | 92.4 |
| Alum/Composition A/Composition M | 300/3/8 | 40 | 91.8 |

[1] = conventional program

Table IV illustrates the advantages of a program containing the dispersion polymer and a flocculant in comparison to a conventional program.

TABLE IV

Screening of Dispersion Polymer of DADMAC and AcAm in Conjunction with Flocculant for the Clarification of DAF Influent (A Southern Newsprint Mill DAF Water)

| Program | Dosage (ppm) | Turbidity (NTU) | % Turbidity Reduction |
|---|---|---|---|
| None | — | 486 | — |
| Alum/Composition A/Composition N[1] | 300/3/4 | 138 | 71.6 |
| Alum/Composition M/Composition N | 300/3/4 | 135 | 72.2 |
| Alum/Composition M/Composition N | 300/6/4 | 125 | 74.3 |
| Alum/Composition M/Composition N | 300/8/4 | 131 | 73.0 |

[1] = conventional treatment

Table V compares the most effective programs in this DAF influent, illustrating the superior performance of the dispersion polymers formed from DADMAC and AcAm.

TABLE V

Screening of Most Active Programs for the Clarification of DAF Influent
(A Southern Newsprint Mill DAF Water)

| Program | Dosage (ppm) | Turbidity (NTU) | % Turbidity Reduction |
|---|---|---|---|
| None | — | 486 | 0 |
| Alum/Composition A/Composition N[1] | 300/3/4 | 138 | 71.6 |
| Alum/Composition M/Composition N | 300/3/4 | 135 | 72.2 |
| No Alum/Composition M | 0/8 | 127 | 73.9 |
| Alum/Composition M | 300/8 | 72 | 85.2 |
| Composition A/Composition M | 3/8 | 91 | 81.3 |
| Alum/Composition A/Composition M | 300/3/8 | 40 | 91.8 |

[1] = conventional treatment

Changes can be made in the composition, operation and arrangement of the method of the present invention described herein without departing from the concept and scope of the invention as defined in the following claims:

We claim:

1. A method for clarifying paper process water containing ink and other impurities comprising adding to the water an effective clarifying amount of a hydrophilic dispersion polymer prepared by polymerizing i.) a cationic monomer diallyl-N,N-disubstituted ammonium halide wherein the substituents of said disubstituted ammonium halide are selected from the group consisting of $C_1$–$C_{20}$ alkyl groups, aryl groups, alkylaryl groups and arylalkyl groups and ii.) a second monomer of the formula

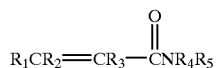

wherein $R_1$ and $R_2$ are selected from the group consisting of hydrogen, $C_1$–$C_{10}$ alkyl groups, aryl groups and alkylaryl groups; $R_3$ is selected from the group consisting of hydrogen and methyl groups and $R_4$ and $R_5$ are selected from the group consisting of $C_1$–$C_{10}$ straight chain or branched alkylene groups and hydrogen, in an aqueous solution of a polyvalent anionic salt wherein the polymerization is carried out in the presence of a dispersant.

2. The process of claim 1 wherein said cationic monomer is diallyldimethyl ammonium chloride and said second monomer is acrylamide.

3. The method of claim 1 wherein the hydrophilic dispersion polymer has a cationic charge of from about 1 mol % to about 30 mol %.

4. The method of claim 1 wherein said polymer has an intrinsic viscosity of from about 0.5 to about 10 deciliters per gram.

5. The method of claim 1 further comprising addition of a coagulant in step a).

6. The method of claim 1 further comprising the addition of a flocculant in step a).

7. The method of claim 5 further comprising the addition of a flocculant in step a).

8. The method of claim 1 further comprising the addition of alum in step a).

9. The method of claim 8 further comprising the addition of a coagulant in step a).

10. The method of claim 1 wherein the clarification is accomplished by dissolved air flotation.

* * * * *